(12) United States Patent
Luo et al.

(10) Patent No.: US 10,229,027 B2
(45) Date of Patent: Mar. 12, 2019

(54) VOLTAGE REGULATOR POWER REPORTING OFFSET SYSTEM

(71) Applicant: Dell Products L.P., Round Rock, TX (US)

(72) Inventors: Shiguo Luo, Austin, TX (US); Ralph Johnson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 325 days.

(21) Appl. No.: 15/130,643

(22) Filed: Apr. 15, 2016

(65) Prior Publication Data

US 2017/0300398 A1    Oct. 19, 2017

(51) Int. Cl.
| | |
|---|---|
| G06F 11/30 | (2006.01) |
| G06F 1/26 | (2006.01) |
| G06F 1/28 | (2006.01) |
| G06F 1/30 | (2006.01) |
| G05F 5/00 | (2006.01) |

(52) U.S. Cl.
CPC ............ *G06F 11/3065* (2013.01); *G05F 5/00* (2013.01); *G06F 1/26* (2013.01); *G06F 1/28* (2013.01); *G06F 1/305* (2013.01); *G06F 11/3024* (2013.01)

(58) Field of Classification Search
None
See application file for complete search history.

(56) References Cited

U.S. PATENT DOCUMENTS

| | | | | |
|---|---|---|---|---|
| 6,661,214 B1 * | 12/2003 | Hann | ...................... | G05F 1/575 |
| | | | | 323/280 |
| 7,219,252 B1 * | 5/2007 | Li | ............................. | G06F 1/08 |
| | | | | 331/177 R |
| 9,547,027 B2 * | 1/2017 | Varma | .................. | G01R 21/133 |

(Continued)

OTHER PUBLICATIONS

George Gillman Richards, III; Abey Mathew; John Jenne and Ralph Johnson, "Calibration of Voltage Regulator," U.S. Appl. No. 14/334,122, filed Jul. 17, 2014, 32 Pages.

(Continued)

*Primary Examiner* — Jaweed A Abbaszadeh
*Assistant Examiner* — Cheri L Harrington
(74) *Attorney, Agent, or Firm* — Haynes and Boone, LLP (57) ABSTRACT

A voltage regulator power reporting offset system includes a monitored power reporting subsystem that determines a monitored power level, offsets the monitored power level using voltage regulator operation offset information to provide a first offset monitored power level, and reports the first offset monitored power level to voltage regulator operation components. A processor power reporting component receives the report of the first offset monitored power level from the monitored power reporting subsystem. A processor power reporting offset subsystem receives the report of the first offset monitored power level from the processor power reporting component, offsets the first offset monitored power level using the processor operation offset information to provide a second offset monitored power level that is different than the first offset monitored power level, and reports the second offset monitored power level to a processing system.

17 Claims, 4 Drawing Sheets

(56) References Cited

U.S. PATENT DOCUMENTS

| | | | | |
|---|---|---|---|---|
| 2010/0169701 A1* | 7/2010 | Tu | ............... | G06F 1/3203 |
| | | | | 713/600 |
| 2011/0258477 A1* | 10/2011 | Baker | ............... | G06F 1/3203 |
| | | | | 713/600 |
| 2012/0194947 A1* | 8/2012 | Nakashimo | ............... | G05F 1/573 |
| | | | | 361/18 |
| 2012/0229104 A1* | 9/2012 | Pierson | ............... | H02M 1/32 |
| | | | | 323/234 |
| 2012/0290852 A1* | 11/2012 | Rahardjo | ............... | G06F 1/26 |
| | | | | 713/300 |
| 2013/0339777 A1* | 12/2013 | Varma | ............... | G06F 1/26 |
| | | | | 713/340 |
| 2014/0043008 A1* | 2/2014 | Babazadeh | ............... | G05F 3/02 |
| | | | | 323/304 |
| 2014/0195828 A1* | 7/2014 | Varma | ............... | G01R 21/133 |
| | | | | 713/300 |
| 2014/0210545 A1* | 7/2014 | Leibowitz | ............... | G11C 5/147 |
| | | | | 327/540 |
| 2015/0280563 A1* | 10/2015 | Tang | ............... | H02M 3/158 |
| | | | | 323/271 |
| 2016/0239061 A1* | 8/2016 | Chen | ............... | G06F 1/3234 |

OTHER PUBLICATIONS

Shiguo Luo, Kejiu Zhang, Wickman Wu, Tsai-Fu Hung and Shih-Chieh Wang, "Per-Phase Current Calibration Method for a Multi-Phase Voltage Regulator," U.S. Appl. No. 14/841,676, filed Aug. 31, 2015, 52 Pages.

Shiguo Luo, Kejiu Zhang and Feng-Yu Wu, "Current Sense Accuracy Improvement for MOSFET RDS (ON) Sense Base Voltage Regulator by Adaptive Temperature Compensation," U.S. Appl. No. 14/924,644, filed Oct. 27, 2015, 34 Pages.

* cited by examiner

VOLTAGE REGULATOR POWER REPORTING OFFSET SYSTEM

BACKGROUND

The present disclosure relates generally to information handling systems, and more particularly to a power reporting offset system for voltage regulators in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers, have begun incorporating processing systems that include processors that utilize real-time power measurement inputs with performance algorithms (e.g., Running Average Power Limit (RAPL) algorithms) that effect performance levels of the processor (e.g., "turbo" performance levels). In such servers, the processors typically rely on power measurements such as the monitored load current ($I_{mon}$) from voltage regulators in the server (e.g., the voltage regulator that provides power to that processor) to regulate their performance level. However, current sensing components in voltage regulators vary in accuracy, resulting in often inaccurate reporting of the $I_{mon}$ from the voltage regulator to the processor, which then directly impacts the performance level of the processor. For example, processor manufacturers typically provide $I_{mon}$ tolerance target values (e.g., in voltage regulator pulse-width modulation (PWM) enabling specifications) that list the target accuracy for voltage regulator sensing components such as direct current resistance (DCR) sensors and metal-oxide semiconductor field-effect transistor (MOSFET) RDSon sensors, and those target accuracy values conventionally allow voltage regulator reporting of $I_{mon}$ that may be off by 4-5% at typical sustained load levels. As such, conventional $I_{mon}$ reporting can lead to different performance levels (e.g., turbo performance variation) across servers or even across processors in the same server.

Conventional solutions to the inaccurate $I_{mon}$ reporting discussed above include applying an offset to the $I_{mon}$ reported by the voltage regulator that results in a desired processor performance level of the processor. For example, if the processor is performing over a target performance level when provided a particular power level, a positive offset may be applied to the $I_{mon}$ reporting for that power level that indicates to the processor an increased power delivery and results in the processor reducing its performance. Similarly, if the processor is performing under a target performance level when provided a particular power level, a negative offset may be applied to the $I_{mon}$ reporting for that power level that indicates to the processor decreased power delivery and results in the processor increasing its performance. However, the offsetting of $I_{mon}$ reported by the voltage regulator to produce a desired processor performance level of the processor raises a number of issues.

For example, offsetting the $I_{mon}$ reported by the voltage regulator may affect the output voltage positioning of the voltage regulator that relies on the reported $I_{mon}$ (e.g., $V_{out}=VID-(LL*I_{mon})$). Furthermore, offsetting the $I_{mon}$ reported by the voltage regulator may affect maximum power detection due to the instantaneous $V_{out}$ trip point being used to predict the maximum power inception point, which can also affect load profile control and system throttling. Further still, offsetting the $I_{mon}$ reported by the voltage regulator may shift load-line regulation, which introduces overshoot or undershoot issues during repetitive processor load transients. Further still, offsetting the $I_{mon}$ reported by the voltage regulator may affect over-current protection set points and result in the voltage regulator not being properly protected against a pre-set overcurrent inception point that allows the voltage regulator to withstand abnormally short excursions above peak current without failing. Further still, offsetting the $I_{mon}$ reported by the voltage regulator may affect auto-phase shedding add/drop thresholds and impact pre-optimized voltage regulator efficiency across the operational load range. These and other issues allow for only relatively small (e.g., ~4%) offsets to be implemented, which limits the full potential of the processor and the ability to achieve maximum processor performance (e.g., "overclocking") even when the system power and/or thermal capacity will support it, while effecting voltage regulator sizing and preventing optimal voltage regulator operation as well.

Accordingly, it would be desirable to provide an improved voltage regulator power reporting offset system.

SUMMARY

According to one embodiment, an Information Handling System (IHS) includes a chassis; a processing system that is housed in the chassis; and a voltage regulator that is housed in the chassis and configured to provide power to the processing system, wherein the voltage regulator includes: a monitored power reporting subsystem that includes voltage regulator operation offset information, wherein the monitored power reporting subsystem is configured to determine a monitored power level, offset the monitored power level using the voltage regulator operation offset information to provide a first offset monitored power level, and report the first offset monitored power level to a plurality of voltage regulator operation components; a processor power reporting component that is configured to receive the report of the first offset monitored power level from the monitored power reporting subsystem; and a processor power reporting offset subsystem that is coupled between the processor power reporting component and the processing system and that includes processor operation offset information, wherein the processor power reporting offset subsystem is configured to receive the report of the first offset monitored power level from the processor power reporting component, offset the first offset monitored power level using the processor operation offset information to provide a second offset monitored power level that is different than the first offset monitored power level, and report the second offset monitored power level to the processing system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
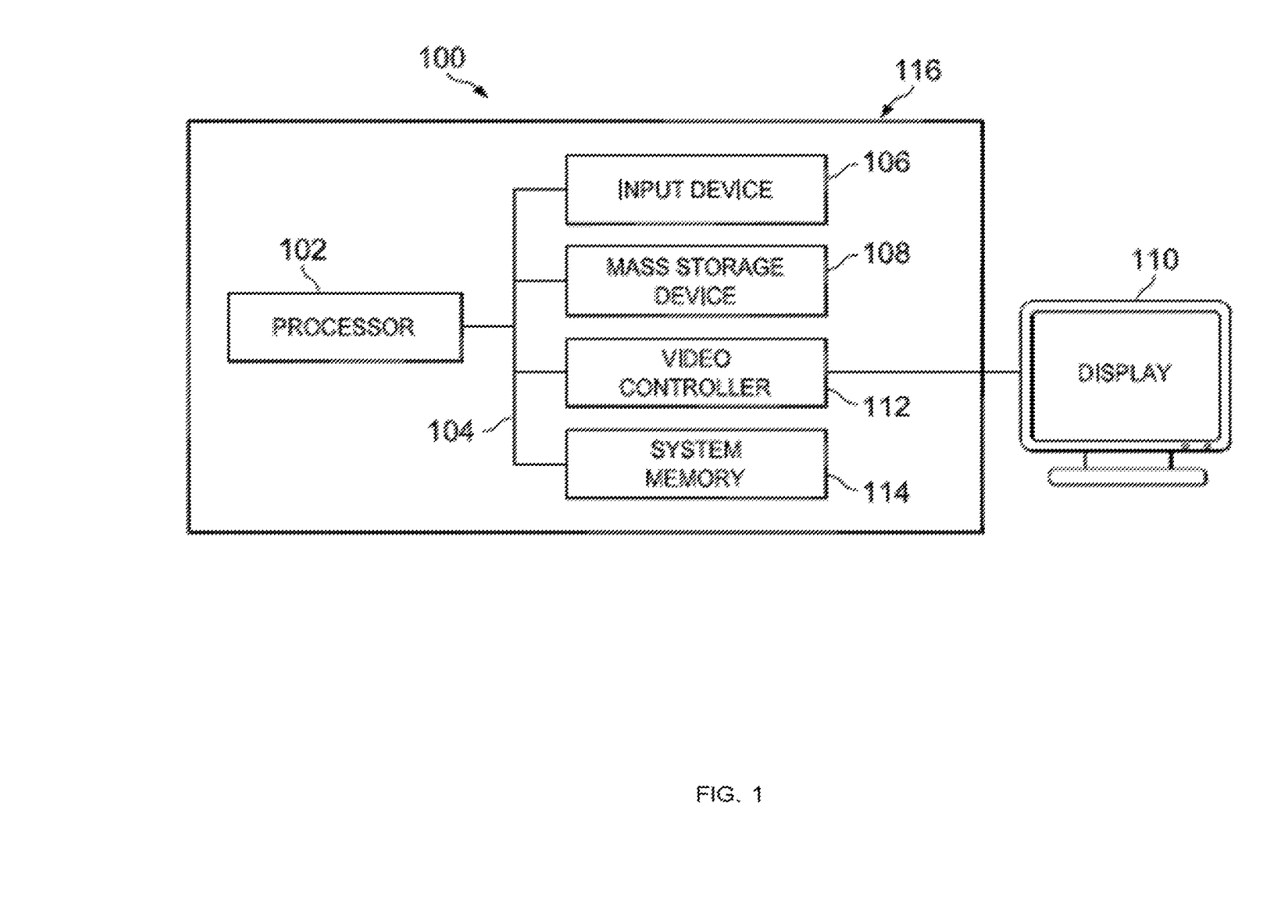
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
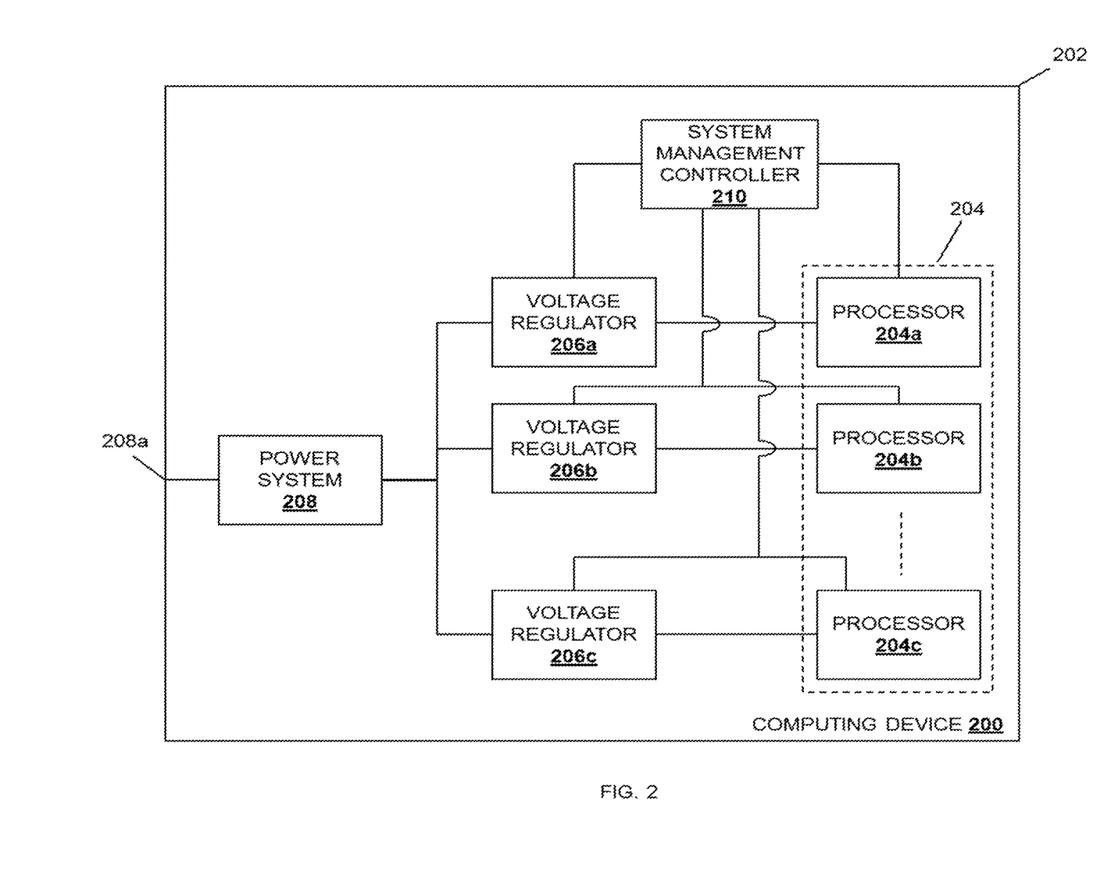
FIG. 2 is a schematic view illustrating an embodiment of a computing device.

Referring now to FIG. 2, an embodiment of a computing device 200 is illustrated. In an embodiment, the computing device 200 may be the IHS 100 discussed above with reference to FIG. 1, and/or may include some or all of the components of the IHS 100. In specific examples discussed below, the computing device 100 is described as a server, although other computing devices such as networking devices (e.g., switches and routers), storage systems, desktop computing devices, laptop/notebook computing devices, tablet computing devices, mobile phones, distributed computing devices (e.g., computing devices with components distributed across more than one chassis), and/or other computing devices known in the art will benefit from the teachings of the present disclosure and thus will fall within its scope. In the illustrated embodiment, the computing device 200 includes a chassis 202 that houses the components of the computing system 200, only some of which are illustrated in FIG. 2. For example, the chassis 202 houses a processing system 204 that includes a plurality of processors 204a, 204b, and up to 204c that each may be provided by a Central Processing Unit (CPU) or other processors known in the art. In the illustrated embodiment, each of the processors 204a-204c is coupled to a respective voltage regulator 206a, 206b, and up to 206c that is also housed in the chassis 202. While a computing device including a plurality of processors each having a dedicated voltage regulator is illustrated and described below, one of skill in the art in possession of the present disclosure will recognize that single processor systems, and well as voltage regulators coupled to more than one processor, will fall within the scope of the present disclosure as well.

In the illustrated embodiment, each of the voltage regulators 206a-206c is coupled to a power system 208 that is housed in the chassis 202 and coupled to a connector 208a that is configured to couple to a power source. For example, the power system 208 may include power supply units (PSUs), power adapters, and/or other power system components known in the art. In the illustrated embodiment, the chassis 202 also houses a system management controller 210 that is coupled to each of the processors 204a-204c and each of the voltage regulators 206a-206c. For example, the controller may be provided by a Power Management Bus (PMBus) master controller that is coupled via a PMBus to each of the processors 204a-204c and voltage regulators 206a-206c, and that as discussed below is configured to characterize performance levels of the processors 204a-204c and access offset control registers in the voltage regulators. While specific components of the computing device 200 have been illustrated and described, one of skill in the art in possession of the present disclosure will recognize that a variety of other components may be provided in the computing device 200 to perform conventional computing device functions based on the desired functionality of the computing device 200 while remaining within the scope of the present disclosure.

Figure 3:
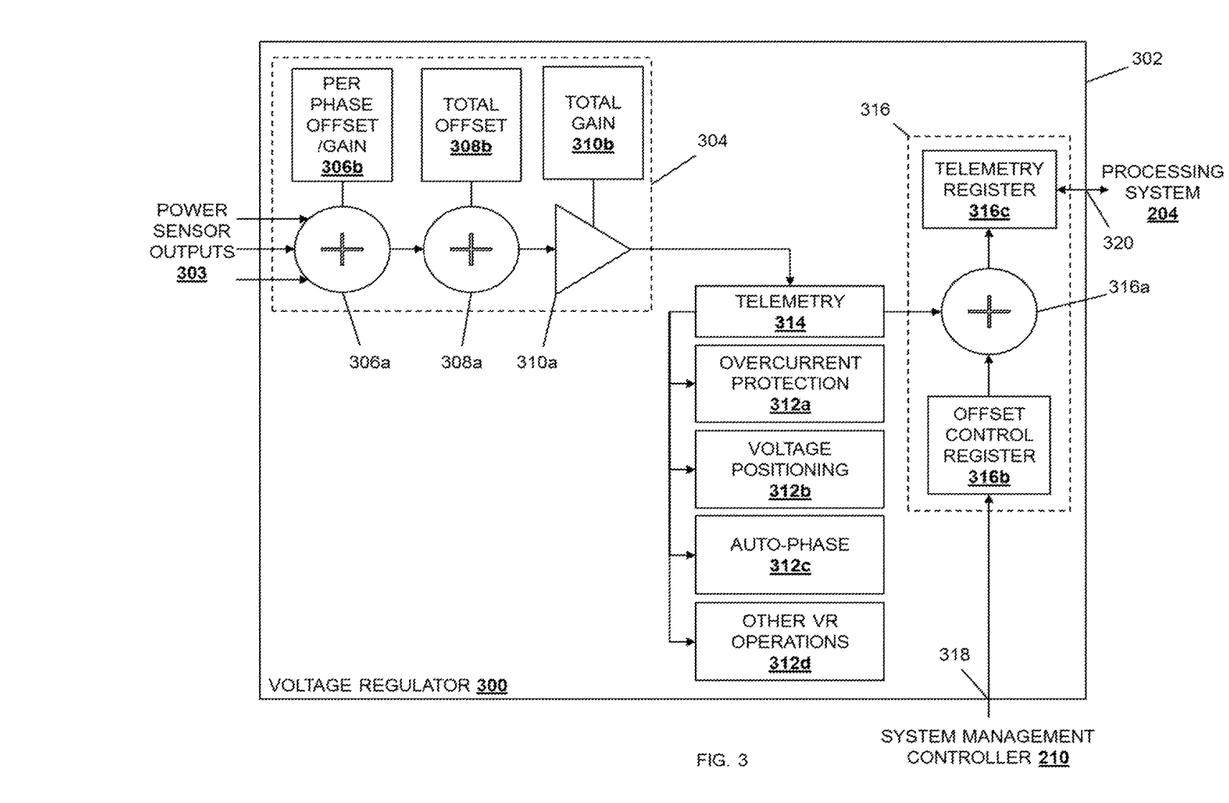
FIG. 3 is a schematic view illustrating an embodiment of a voltage regulator used in the computing device of FIG. 2.

Referring now to FIG. 3, an embodiment of a voltage regulator 300 is illustrated that may be any of the voltage regulators 206a-206c discussed above with reference to FIG. 2. In some embodiments, the voltage regulator 300 may be a multi-phase voltage regulator. In the illustrated embodiment, the voltage regulator 300 includes a chassis 302 housing or supporting the components of the voltage regulator 300, only some of which are illustrated in FIG. 3. For example, one of skill in the art in possession of the present disclosure will recognize that FIG. 3 illustrates a portion of a voltage regulator control subsystem in the voltage regulator 300 that processes load current signals received from power output sensors, and that the voltage regulator 300 may include a variety of other voltage regulator components that perform conventional voltage regulator operations. The chassis 302 may provide an enclosure that houses the components of the voltage regulator 300, or include a circuit board that supports the components of the voltage regulator 300. However, embodiments in which the components of the voltage regulator 300 are distributed across more than one chassis are envisioned as falling within the scope of the present disclosure as well. The voltage regulator 300 includes a monitored power reporting subsystem 304 that, as discussed below, provides a load current sensor calibration subsystem for the voltage regulator 300 that is configured to receive power sensor outputs 303 (e.g., DCR sensor outputs, MOSFET RDSon sensor outputs, resistive element sensor outputs, etc.), process those power sensor outputs 303 to determine a monitored power level that is a total load power value being provided to a load (e.g., the processing system 204), offset the monitored power level to provide a first offset monitored power level, and report the first offset monitored power level (e.g., to a voltage regulator controller). In the embodiment illustrated in FIG. 3 and discussed below, the monitored power reporting subsystem 304 is a monitored current ($I_{mon}$) reporting subsystem that includes a per-phase $I_{mon}$ offset/gain component 306a, a total $I_{mon}$ offset component 308a, and a total $I_{mon}$ gain component 310a, although other $I_{mon}$ related components and/or other types of power reporting components are envisioned as falling within the scope of the present disclosure.

As discussed below, the monitored power reporting subsystem 304 may be provided with voltage regulator operation offset information that, in the illustrated embodiment, is provided by per-phase $I_{mon}$ calibration offset/gain information 306b that is included in or accessible by the per-phase $I_{mon}$ offset/gain component 306a, total $I_{mon}$ calibration offset information 308b that is included in or accessible by the total $I_{mon}$ offset component 308a, and total $I_{mon}$ calibration gain information 310b that is included in or accessible by the total $I_{mon}$ gain component 310a. As such, in some embodiments, the monitored power reporting subsystem 304 is an $I_{mon}$ calibration subsystem that may be statically set (e.g., via the voltage regulator operation offset information) to meet $I_{mon}$ reporting accuracy requirements (e.g., such as those discussed above) while optimizing operation of the voltage regulator 300 as discussed below. However, similarly as discussed above, other $I_{mon}$ offset information and/or other types of power reporting offset information is envisioned as falling within the scope of the present disclosure as well.

The monitored power reporting subsystem 304 is coupled to a plurality of voltage regulator operation components that, in the illustrated embodiment, include an overcurrent protection component 312a, a voltage positioning component 312b, an auto-phase component 312c, and other voltage regulator operations component 312d that would be apparent to one of skill in the art in possession of the present disclosure, each of which is coupled to the total $I_{mon}$ gain component 310a through a telemetry component 314 to receive reports of a first offset monitored power level. As discussed below, the voltage regulator operation offset information (e.g., the per-phase $I_{mon}$ calibration offset/gain information 306b, total $I_{mon}$ calibration offset information 308b, and total $I_{mon}$ calibration gain information 310b discussed above) may be utilized by the monitored power reporting subsystem 304 to provide an offset to the $I_{mon}$ that is detected by the sensing components (e.g., DCR sensors, MOSFET RDSon sensors, etc.) in the voltage regulator 300 and reported as a first offset $I_{mon}$ through the telemetry component 314 to the voltage regulator operation components, and that offset may provide the first offset $I_{mon}$ that, when reported to the voltage regulator operation components, is configured to optimize the operation of the voltage regulator operation components, thus allowing the "tuning" of the voltage regulator design and operation across its full operational load range.

The voltage regulator 300 also includes a processor power reporting offset subsystem 316 that is coupled through a processor power reporting component to the total $I_{mon}$ gain component 310a in the monitored power reporting subsystem 304. In the illustrated embodiment, the processor power reporting component is the telemetry component 314 that provides the first offset $I_{mon}$ to each of the voltage regulator operation components as discussed above, but other processor power reporting components are envisioned as falling within the scope of the present disclosure. As discussed below, the processor power reporting offset subsystem 316 is configured to receive the report of the first offset monitored power level from the telemetry component 314, offset the first offset monitored power level to provide a second offset monitored power level, and report the second offset monitored power level to the processing system 204. In the embodiment illustrated in FIG. 3 and discussed below, the processor power reporting offset subsystem 316 includes a first offset $I_{mon}$ offset component 316a that is coupled to the telemetry component 314, an offset control register 316b that is coupled to the first offset $I_{mon}$ offset component 316a and a connector 318 that may couple to the system management controller 210, and a telemetry register 316c that is coupled to the first offset $I_{mon}$ offset component 316a and a connector 320 that may couple to the processing system 204. In a specific example, the offset control register 316b may be provided by a serial voltage identification (SVID) $I_{mon}$ offset control register, and the telemetry register 316c may be provided by an SVID $I_{mon}$ telemetry register (e.g., 0x15) that a coupled to the processing system 204 via an SVID bus. As discussed below, the processor power reporting offset subsystem 316 is configured to receive processor operation offset information from the system management controller 210 via the offset control register 316b, and apply that processor operation offset information to the first offset $I_{mon}$ reported to the telemetry component 314 to produce a second offset $I_{mon}$ that, when reported to the processing system 204, configured to optimize the operation of the processor(s) without impacting fundamental operations of the voltage regulator 300 that are performed by the voltage regulator operation components.

Figure 4:
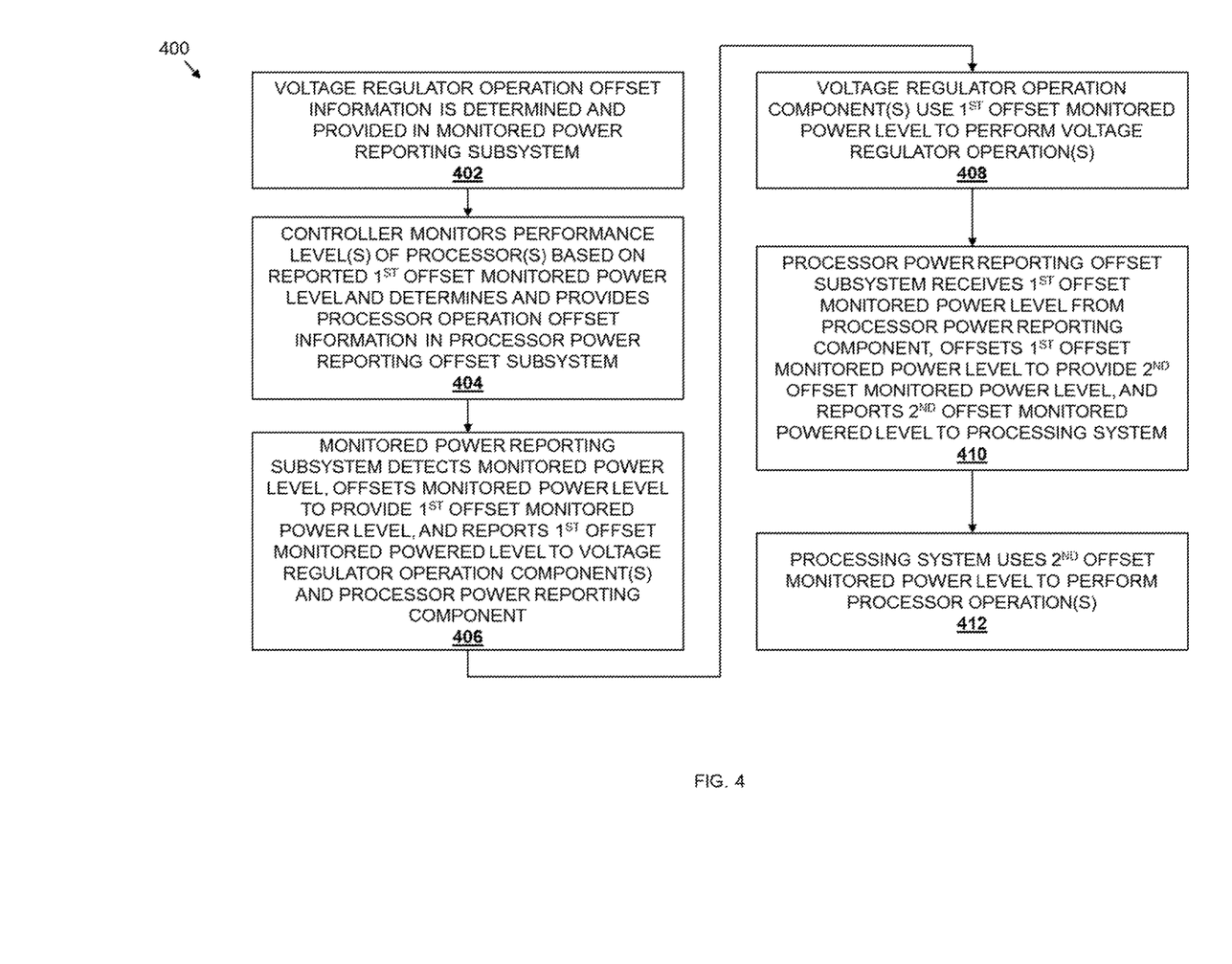
FIG. 4 is a flow chart illustrating an embodiment of a method for offsetting power reporting in a voltage regulator.

Referring now to FIG. 4, an embodiment of a method 400 for offsetting power reporting in a voltage regulator is illustrated. As discussed below, the systems and methods of the present disclosure provide for a systematic offset definition and offset application strategy that applies different offsets to monitored power reports generated in a voltage regulator in order to target particular functions and performance in voltage regulators and processing systems. Such systems and methods allow for improved manipulation of monitored power reporting (e.g., $I_{mon}$ reporting) to the processing system without the associated negative effects that can occur with voltage regulator operation components that conventionally utilize the same monitored power reporting as the processing system to perform fundamental voltage regulator operations. As such, the monitored power reporting to the voltage regulator operation components may be "tuned" separately from the monitored power reporting to the processing system in order to optimize voltage regulator design and operation across its full operational load range, while optimizing processing system operation and performance as well.

The method 400 begins at block 402 where voltage regulator operation offset information is determined and provided in a monitored power reporting subsystem. In an embodiment, at block 402 the voltage regulator operation offset information may be determined and provided in the monitored power reporting subsystem 304. For example, per-phase $I_{mon}$ calibration offset/gain information 306b may be provided with the per-phase $I_{mon}$ offset/gain component 306a, total $I_{mon}$ calibration offset information 308b may be provided with the total $I_{mon}$ offset component 308a, and total $I_{mon}$ calibration gain information 310b may be provided with the total $I_{mon}$ gain component 310a. In a specific example, during the initial design of the voltage regulator 300 and/or computing device 200, the $I_{mon}$ detection capabilities of the current sensing components in the voltage regulator 300 may be tested to determine the accuracy of $I_{mon}$ detection and reporting. As discussed above, current sensing components in the voltage regulator 300 vary in accuracy, resulting in inaccurate reporting of the $I_{mon}$ by the voltage regulator. At block 402, the voltage regulator operation offset information may be determined that compensates for those current sensing inaccuracies of the detected $I_{mon}$ by offsetting that detected $I_{mon}$ such that it may be used by the voltage regulator operation components 312a, 312b, 312c, and 312d to perform voltage regulator operations that are optimized across the full operation load range of the voltage regulator.

For example, the per-phase $I_{mon}$ calibration offset/gain information 306b may be information that provides for voltage regulator phase offsetting (e.g., a per-phase offset, an offset applied to all phases at once, etc.) that may "tune" cycle-by-cycle phase current limits, current sharing between phases, $V_{out}$ positioning, overcurrent thresholds, auto-phasing control, transient response nonlinear control, total $I_{mon}$ for voltage regulator control, and total $I_{mon}$ for telemetry. In another example, the total $I_{mon}$ calibration offset information 308b and the total $I_{mon}$ calibration gain information 310 may be information that provides for total $I_{mon}$ offsetting for voltage regulator control that may "tune" total $I_{mon}$ dedicated for voltage regulator control, $V_{out}$ positioning, overcurrent thresholds, and maximum power tracking through $V_{out}$. While a few specific examples of voltage regulator operation offset information have been provided, one of skill in the art in possession of the present disclosure will recognize that the determination of other voltage regulator operation offset information that provides for optimized voltage regulator design and operations across its full operational load range, and the provisioning of that voltage regulator operation offset information in the monitored power reporting subsystem 304, will fall within the scope of the present disclosure as well.

The method 400 then proceeds to block 404 where a controller monitors one or more performance levels of one or more processors based on a reported first offset monitored power level, and determines and provides processor operation offset information in a processor power reporting offset subsystem. In an embodiment, at block 404, the system management controller 210 may monitor performance level(s) of the processors 204a-204c based on a first reported first offset monitored power level in order to determine and provide processor operation offset information in the processor power reporting offset subsystem 316. For example, during initial design of the computing device 200, upon initialization of the computing device 200, and/or at other times, the system management controller 210 may monitor the operation of the processors 204a-204c when there is no processor operation offset information in the offset control register 316b (or processor operation offset information in the offset control register 316b does not offset the first offset $I_{mon}$ received by the telemetry component 314 and provided to the processing system 204) of their respective voltage regulators 206a-206c. As such, the operation of the processors 204a-204c based on the first offset $I_{mon}$ determined and reported by the monitored power reporting subsystem 304 of their respective voltage regulators 206a-206c may be monitored by the system management controller 210 at block 404. While not illustrated, the system management controller 210 may be coupled to the processors/voltage regulators in other computing devices (e.g., computing devices in the same rack or chassis as the computing device 200, computing devices in the same datacenter as the computing device 200, etc.) in order to monitor the operation of other processors based on the reported first offset $I_{mon}$ determined and reported by the monitored power reporting subsystem of their respective voltage regulators as well.

From the monitored operation of each processor 204a-204c based on the first offset $I_{mon}$ determined and reported by the monitored power reporting subsystem of their respective voltage regulators, the system management controller 210 may determine processor operation offset information. For example, for any particular processor/voltage regulator, the reported first offset $I_{mon}$ may cause the processor to operate at a lower performance level or a higher performance level than is desired, and the processor operation offset information may be determined to offset the first offset $I_{mon}$ in order to under-report power to the processor and cause that processor to increase its performance level. Similarly, the processor operation offset information may be determined to offset the first offset $I_{mon}$ in order to over-report power to the processor and cause that processor to decrease its performance level. In some examples, for groups of processors (e.g., the processors 204a-204c), the reported first offset $I_{mon}$ from their respective voltage regulators may cause the processors to operate differently (e.g., the processor 204a may operate at a first performance level, the processor 204b may operate at a second performance level, and the processor 204c may operate at a third performance level), and processor operation offset information may be determined to offset the first offset $I_{mon}$ from the respective voltage regulators to report power to the processors that causes those processors to operate at the same performance level. While a few examples have been provided, one of skill in the art in possession of the present disclosure will recognize how a variety of processor operation offset information may be determined from processor operation based on the first offset $I_{mon}$ in order to offset that first offset $I_{mon}$ to cause the processor to behave in a desired manner while remaining within the scope of the present disclosure.

Once the system management controller 210 has characterized the processor operation based on the first offset $I_{mon}$, the system management controller 210 may provide that processor operation offset information in the offset control register 316b. For example, as discussed above, the offset control register 316b may be an SVID $I_{mon}$ offset control register, and in a specific embodiment may be provided with data in a binary/8-bit 2's complement offset format where the most significant bit is a 1, and may be configured to enable both the under-reporting to increase processor performance and the over-reporting to reduce system performance that is detailed above. As such, blocks 402 and 404 of the method 400 provide for the determination of offset information that both optimizes voltage regulator operation and processing system operation, and provides that offset information in the monitored power reporting subsystem and processor power reporting offset subsystem.

The method 400 then proceeds to block 406 where the monitored power reporting subsystem detects a monitored power level, offsets the monitored power level to provide a first offset monitored power level, and reports the first offset monitored power level to one or more voltage regulator operation components and a processor power reporting component. In an embodiment, following the processing system characterization and associated determination of the processor operation offset information at block 404, the monitored power reporting subsystem 304 may operate to report the first offset monitored power level as discussed above. For example, power sensor outputs 303 (e.g., load current sensor outputs) may be received from the power sensors (e.g., DCR sensors, MOSFET RDSon sensors, resistive element sensors, etc.). In a specific example, the sensing components in the voltage regulator 300 may detect report the $I_{mon}$ to the per-phase $I_{mon}$ offset/gain component 306a. For example, FIG. 3 illustrates a multi-phase implementation in which each phase of the $I_{mon}$ that is contributing to the load (i.e., the processing system) is reported by the power sensor outputs 303 to the per-phase $I_{mon}$ offset/gain component 306a of the monitored power reporting subsystem 304. The per-phase $I_{mon}$ offset/gain component 306a may then apply the per-phase $I_{mon}$ calibration offset/gain information to the $I_{mon}$ and report a first 'partially offset' $I_{mon}$ to the total $I_{mon}$ offset component 308a. The total $I_{mon}$ offset component 308a may then apply the total $I_{mon}$ calibration offset information 308b to the first 'partially offset' $I_{mon}$ and report a second 'partially offset' $I_{mon}$ to the total $I_{mon}$ gain component 310a. The total $I_{mon}$ gain component 310a may then apply the total $I_{mon}$ calibration gain information 310b to the second 'partially offset' $I_{mon}$ and report a first offset $I_{mon}$ to the processor power reporting component (e.g., the telemetry component 314) and the voltage regulator operation components (e.g., the overcurrent protection component 312a, the voltage positioning component 312b, the auto-phase component 312c, and the other voltage regulator operations components 312d).

The method 400 then proceeds to block 408 where the one or more voltage regulator operation components use the first offset monitored power level to perform voltage regulator operations. In an embodiment, each of the overcurrent protection component 312a, the voltage positioning component 312b, the auto-phase component 312c, and the other voltage regulator operations components 312d may utilize the first offset $I_{mon}$ that was reported by the monitored power reporting subsystem 304 to the telemetry component 314 to perform voltage regulator operations. For example, the voltage positioning component 312b may use the first offset $I_{mon}$ that was reported by the monitored power reporting subsystem 304 to the telemetry component 314 to provide optimized output voltage positioning for the voltage regulator. In another example, the first offset $I_{mon}$ that was reported by the monitored power reporting subsystem 304 the telemetry component 314 may be used to determine a $V_{out}$ trip point to predict a maximum power inception point in order to perform optimized maximum power detection, and similar operations can provide for optimized load profile control and system throttling. In another example, the first offset $I_{mon}$ that was reported by the monitored power reporting subsystem 304 the telemetry component 314 may avoid the shifting of load-line regulation, and prevent overshooting or undershooting issues during repetitive processor load transients. In another example, the overcurrent protection component 312a may use the first offset $I_{mon}$ that was reported by the monitored power reporting subsystem 304 to the telemetry component 314 to determine over-current protection set points that properly protect the voltage regulator against a pre-set overcurrent inception point that allows the voltage regulator to withstand abnormally short excursions above peak current without failing. In another example, the auto-phase component 312c may use the first offset $I_{mon}$ that was reported by the monitored power reporting subsystem 304 to the telemetry component 314 to set auto-phase shedding add/drop thresholds and optimize voltage regulator efficiency across the operational load range. While a few specific examples of voltage regulator operations performed by the voltage regulator operation components using the first offset $I_{mon}$ have been described, one of skill in the art in possession of the present disclosure will recognize that other voltage regulator operations may be optimized using the first offset $I_{mon}$ while remaining within the scope of the present disclosure.

The method 400 then proceeds to block 410 where the processor power reporting offset subsystem receives the first offset monitored power level, offsets the first offset monitored power level to provide a second offset monitored power level, and reports the second offset monitored power level to a processing system. In an embodiment, at block 410, the the telemetry component 314 receives the first offset $I_{mon}$ that was reported by the monitored power reporting subsystem 304 the telemetry component 314, and reports the first offset $I_{mon}$ to the processor power reporting offset subsystem 316. The first offset $I_{mon}$ offset component 316a may then receive the report of the first offset $I_{mon}$ from the telemetry component 314 and apply the processor operation offset information in the offset control register 316b to the first offset $I_{mon}$ in order to offset the first offset $I_{mon}$ to provide a second offset $I_{mon}$ that is different than the first offset $I_{mon}$. The first offset $I_{mon}$ offset component 316a may then provide information describing the second offset $I_{mon}$ in the telemetry register 316c. In an embodiment, the provisioning of the information describing the second offset $I_{mon}$ in the telemetry register 316c results in the reporting of the second offset $I_{mon}$ to the processing system 204 due to the ability of the processing system 204 to access that telemetry register 316c via the connector 320.

The method 400 then proceeds to block 412 where the processing system uses the second offset monitored power level to perform processor operations. In an embodiment, the processors 204a-204c in the processing system 204 may then access the telemetry registers 316c in the processor power reporting offset subsystems of their respective voltage regulators 300, and utilize the information describing the second offset $I_{mon}$ in order to perform processor operations. As discussed above, the second offset $I_{mon}$ may be utilized by processors 204a-204c to determine a performance level at which to operate, and the second offset $I_{mon}$ may have been determined and provided in order to define the performance level at which a processor should operate based on the first offset $I_{mon}$ being reported by the monitored power reporting subsystem 304. For example, the second offset $I_{mon}$ may be determined such that each of the processors 204a-204c enter a turbo mode at substantially the same time at block 412 when the use of the first offset $I_{mon}$ would cause the processors 204a-204c to exhibit the turbo mode performance variations discussed above. In another example, the second offset $I_{mon}$ is lower than the first offset $I_{mon}$ to cause increased performance of the processor relative to a performance level of the processor that would result from the first offset $I_{mon}$ (e.g., an offset value applied to the first offset $I_{mon}$ to under-report the power (i.e., as the second offset $I_{mon}$) being delivered to the processor by 2 amps may cause the processor to increase performance). In another example, the second offset $I_{mon}$ is higher than the first offset $I_{mon}$ to cause decreased performance of the processor relative to a performance level of the processor that would result from the first offset $I_{mon}$ (e.g., an offset value applied to the first offset $I_{mon}$ to over-report the power (i.e., as the second offset $I_{mon}$) being delivered to the processor by 2 amps may cause the processor to decrease performance). While a few specific examples of processor operations performed by the processing system using the second offset $I_{mon}$ have been described, one of skill in the art in possession of the present disclosure will recognize that other processor operations may be optimized using the second offset $I_{mon}$ while remaining within the scope of the present disclosure.

Thus, systems and methods have been described that provide for a systematic offset definition and offset application strategy that applies different offsets in a voltage regulator power reporting to optimize functions and performance in voltage regulators and processing systems. Such systems and methods allow for improved manipulation of monitored power reporting (e.g., $I_{mon}$ reporting) to the processing system without the associated negative effects that can occur with voltage regulator operation components that conventionally utilize the same monitored power reporting as the processing system to perform fundamental voltage regulator operations. As a result, a wider range of offsets may be applied to monitored power reporting without negative effects to voltage regulator operation. For example, instead of gaining only one or two turbo boost frequency bins in a processor, the potential power and thermal capacity of the processor can be better utilized for over-clocking scenarios (particularly on relatively lower wattages processors in systems with relatively high power voltage regulator support.) Furthermore, $V_{out}$ positioning and maximum power detection through the $V_{out}$ trip (included in processing systems provided by INTEL® corporation of Santa Clara, Calif., United States) may be provided in a desired range by "tuning" the control offset. Further still, average processor and system performance based on a 100 μs power telemetry polling cycle may be maximized as long as power and thermal capability are high enough and excursions beyond the maximum are allowed, while peak power and maximum power detection via minimum $V_{out}$ triggers and management are not affected.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Information Handling System (IHS), comprising:
a chassis;
a processing system that is housed in the chassis; and
a voltage regulator that is housed in the chassis and configured to provide power to the processing system, wherein the voltage regulator includes:
a monitored power reporting subsystem that includes voltage regulator operation offset information, wherein the monitored power reporting subsystem is configured to determine a monitored power level, offset the monitored power level using the voltage regulator operation offset information to provide a first offset monitored power level for use by a plurality of voltage regulator operation components, and report the first offset monitored power level to the plurality of voltage regulator operation components, wherein the voltage regulator operation offset information is configured to provide for operation of the plurality of voltage regulator operation components such that a full operational load range of the voltage regulator is achieved;
a processor power reporting component that is configured to receive the report of the first offset monitored power level from the monitored power reporting subsystem; and
a processor power reporting offset subsystem that is coupled between the processor power reporting component and the processing system and that includes processor operation offset information, wherein the processor power reporting offset subsystem is configured to receive the report of the first offset monitored power level from the processor power reporting component, offset the first offset monitored power level using the processor operation offset information to provide a second offset monitored power level that is different than the first offset monitored power level, and report the second offset monitored power level to the processing system, wherein the processor operation offset information is configured to provide over-clocking of the processing system.

2. The IHS of claim 1, further comprising:
a controller that is housed in the chassis and coupled to the voltage regulator, wherein the controller is configured to provide the processor operation offset information to the processor power reporting offset system.

3. The IHS of claim 2, wherein the controller is configured to monitor at least one performance level of the processing system that results based on the reporting of the first offset monitored power level to the processing system and, in response, determine the processor operation offset information.

4. The IHS of claim 1, wherein the plurality of voltage regulator operation components include at least one of an overcurrent protection component, a voltage positioning component, and an autophase component that are configured to use the report of the first offset monitored power level to perform at least one voltage regulator operation.

5. The IHS of claim 1, wherein the second offset monitored power level is lower than the first offset monitored power level and the reporting of the second offset monitor power level to the processing system provides for increased performance of the processing system relative to a performance level of the processing system that results based on reporting the first offset monitored power level to the processing system.

6. The IHS of claim 1, wherein the second offset monitored power level is higher than the first offset monitored power level and the reporting of the second offset monitor power level to the processing system provides for decreased performance of the processing system relative to a performance level of the processing system that results based on reporting the first offset monitored power level to the processing system.

7. A voltage regulator power reporting offset system, comprising:
a monitored power reporting subsystem that includes voltage regulator operation offset information, wherein the monitored power reporting subsystem is configured to determine a monitored power level, offset the monitored power level using the voltage regulator operation offset information to provide a first offset monitored power level for use by a plurality of voltage regulator operation components, and report the first offset monitored power level to the plurality of voltage regulator operation components, wherein the voltage regulator operation offset information is configured to provide for operation of the plurality of voltage regulator operation components such that a full operational load range of the plurality of voltage regulator operation components is achieved;

a processor power reporting component that is configured to receive the report of the first offset monitored power level from the monitored power reporting subsystem; and a processor power reporting offset subsystem that is coupled between the processor power reporting component and a processing system connection and that includes processor operation offset information, wherein the processor power reporting offset subsystem is configured to receive the report of the first offset monitored power level from the processor power reporting component, offset the first offset monitored power level using the processor operation offset information to provide a second offset monitored power level that is different than the first offset monitored power level, and report the second offset monitored power level through the processing system connection, wherein the processor operation offset information is configured to provide over-clocking of a processing system that is coupled to the processing system connection.

8. The system of claim 7, wherein the processor power reporting offset subsystem includes a controller connection and is configured to receive the processor operation offset information through the controller connection.

9. The system of claim 7, wherein the plurality of voltage regulator operation components include at least one of an overcurrent protection component, a voltage positioning component, and an autophase component that are configured to use the report of the first offset monitored power level to perform at least one voltage regulator operation.

10. The system of claim 7, wherein the second offset monitored power level is lower than the first offset monitored power level and the reporting of the second offset monitor power level through the processing system connection provides for increased performance of a processing system relative to a performance level of the processing system that results based on reporting the first offset monitored power level to the processing system.

11. The system of claim 7, wherein the second offset monitored power level is higher than the first offset monitored power level and the reporting of the second offset monitor power level through the processing system connection provides for decreased performance of a processing system relative to a performance level of the processing system that results based on reporting the first offset monitored power level to the processing system.

12. A method for offsetting power reporting in a voltage regulator, comprising:

determining, by a monitored power reporting subsystem in a voltage regulator, a monitored power level;

offsetting, by the monitored power reporting subsystem, the monitored power level using voltage regulator operation offset information to provide a first offset monitored power level for use by a plurality of voltage regulator operation components;

reporting, by the monitored power reporting subsystem, the first offset monitored power level to the plurality of voltage regulator operation components, wherein the voltage regulator operation offset information provides for operation of the plurality of voltage regulator operation components such that a full operational load ramie of the voltage regulator is achieved;

receiving, by a processor power reporting component, the report of the first offset monitored power level from the monitored power reporting subsystem;

receiving, by a processor power reporting offset subsystem that is coupled between the processor power reporting component and a processing system, the report of the first offset monitored power level from the processor power reporting component;

offsetting, by the processor power reporting offset subsystem, the first offset monitored power level using processor operation offset information to provide a second offset monitored power level that is different than the first offset monitored power level; and reporting, by the processor power reporting offset subsystem, the second offset monitored power level to the processing system, wherein the processor operation offset information is configured to provide over-clocking of the processing system.

13. The method of claim 12, further comprising:

providing, by a controller, the processor operation offset information to the processor power reporting offset system.

14. The method of claim 13, further comprising:

monitoring, by the controller, at least one performance level of the processing system that results based on the reporting of the first offset monitored power level to the processing system and, in response, determining the processor operation offset information.

15. The method of claim 12, wherein the plurality of voltage regulator operation components include at least one of an overcurrent protection component, a voltage positioning component, and an autophase component, and wherein the method further comprises:

using, by the at least one of the overcurrent protection component, the voltage positioning component, and the autophase component, the report of the first offset monitored power level to perform at least one voltage regulator operation.

16. The method of claim 12, wherein the second offset monitored power level is lower than the first offset monitored power level and the reporting of the second offset monitor power level to the processing system provides for increased performance of the processing system relative to a performance level of the processing system that results based on reporting the first offset monitored power level to the processing system.

17. The method of claim 12, wherein the second offset monitored power level is higher than the first offset monitored power level and the reporting of the second offset monitor power level to the processing system provides for decreased performance of the processing system relative to a performance level of the processing system that results based on reporting the first offset monitored power level to the processing system.

* * * * *